United States Patent
Bader et al.

(10) Patent No.: US 8,780,710 B2
(45) Date of Patent: Jul. 15, 2014

(54) PRIORITY FLOW HANDLING IN STATELESS DOMAINS

(75) Inventors: Attila Bader, Paty (HU); Andras Csaszar, Budapest (HU)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 1200 days.

(21) Appl. No.: 12/602,334

(22) PCT Filed: May 29, 2007

(86) PCT No.: PCT/EP2007/055178
§ 371 (c)(1), (2), (4) Date: Dec. 11, 2009

(87) PCT Pub. No.: WO2008/145178
PCT Pub. Date: Dec. 4, 2008

(65) Prior Publication Data
US 2010/0177633 A1    Jul. 15, 2010

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/56 | (2006.01) |
| H04L 12/54 | (2013.01) |

(52) U.S. Cl.
CPC .......... H04L 47/2408 (2013.01); H04L 47/724 (2013.01); H04L 47/745 (2013.01); H04L 47/26 (2013.01); H04L 47/15 (2013.01); H04L 47/10 (2013.01); H04L 47/11 (2013.01); H04L 47/826 (2013.01); H04L 12/5695 (2013.01); H04L 47/32 (2013.01); H04L 47/822 (2013.01); H04L 47/245 (2013.01); H04L 47/746 (2013.01); H04L 47/805 (2013.01)

USPC .......................................... 370/230

(58) Field of Classification Search
None
See application file for complete search history.

(56) References Cited

U.S. PATENT DOCUMENTS

| | | | | |
|---|---|---|---|---|
| 6,157,613 A | * | 12/2000 | Watanabe et al. | 370/229 |
| 2004/0208125 A1 | * | 10/2004 | Damon et al. | 370/235 |

FOREIGN PATENT DOCUMENTS

| | | |
|---|---|---|
| EP | 0730390 A2 | 9/1996 |
| WO | 2006/052174 A1 | 5/2006 |

OTHER PUBLICATIONS

Stokkink, G, Jan. 30, 2006, "Performance Evaluation of Severe Congestion Handling Solutions for Multilevel Service in RMD Domains.", 4th Twente student Conference on IT, Pg.'s 1-10.*

(Continued)

Primary Examiner — Jason Mattis
Assistant Examiner — Adnan Baig
(74) Attorney, Agent, or Firm — Coats and Bennett P.L.L.C.

(57) ABSTRACT

A method of managing quality of service in an IP network is provided. The method comprises identifying, at an egress edge node of the network, that congestion is present in one or more routers within the network. Data flows for termination to remove the congestion are selected. At least one flow termination notification is sent from the egress edge node to an ingress edge node of the network, the at least one flow termination notification identifying the selected data flows. Low priority flows from the selected data flows are terminated at the ingress edge node immediately. High priority flows are terminated only if congestion is still present after a predetermined delay period. The delay may be applied in the ingress edge node or the egress edge node. The invention also provides a method for admitting low priority flows into the network only if the network has resources available for a number of high priority flows above a dynamically determined threshold.

18 Claims, 2 Drawing Sheets

(56) References Cited

OTHER PUBLICATIONS

Csaszar, A. et al. "Severe Congestion Handling with Resource Management in Diffserv on Demand." Lecture Notes in Computer Science, Springer Verlag, Berlin, Germany, vol. 2345, May 2002, pp. 1-12, XP002332844.

Goering, P. "IPv6 based—On Demand Resource Management in Diffserv (RMD)." Master of Science Thesis, University of Twente, The Netherlands, Electrical Engineering, Aug. 14, 2003, XP002332843.

Csaszar, A. et al. "A Practical Method for the Efficient Resolution of Congestion in an On-path Reduced-State Signalling Environment". QOS in 3rd/4th Generation Mobile Systems, Jun. 9, 2005, pp. 286-297, XP002469052.

Stokkink, G. "Performance Evaluation of Severe Congestion Handling Solutions for Multilevel Service in RMD Domains." 4th Twente Student Conference on IT, Jan. 30, 2006, pp. 1-10, XP002469051.

* cited by examiner

PRIORITY FLOW HANDLING IN STATELESS DOMAINS

FIELD OF THE INVENTION

The present invention relates to priority flow handling in stateless IP network domains. In particular, the invention relates to a system for maintaining high priority flows when there is congestion in networks.

BACKGROUND TO THE INVENTION

The provision of emergency services is increasingly important in telecommunications networks. Emergency calls or data flows must usually have priority over other calls or data flows in the network. The ITU-T Recommendation Y.1541, "Network Performance Objectives for IP-Based Services", May 2002, specifies different priority types for IP networks.

In IP networks, resource management protocols on the data path have been investigated in recent years to ensure quality of service (QoS). Such protocols are responsible for ensuring that resource needs are met for data flows arriving at the edge of a network domain or autonomous system, and to ensure that the interior nodes of the domain are provided with information regarding the future path of the flow. This enables the interior nodes to make a local admission control decision. A flow is usually admitted into a network domain only if all interior nodes in the path have admitted it. A flow is admitted end-to-end only if all intermediate domains have made a positive admission decision. The admission of a flow also requires the reservation of resources in all interior nodes (except for pure measurement based admission control).

Integrated Services (IntServ) is one architecture adopted to ensure QoS for real-time and non real-time traffic in the Internet. The Internet Engineering Task Force (IETF) standardization organization has specified the Resource ReSerVation Protocol (RSVP) for reserving resources in IP routers, as specified in RFC 2205. Each router along the data path stores "per flow" reservation states. The reservation states are "soft" states, which have to be refreshed by sending periodic refresh messages. If a reserved state is not refreshed, the state and the corresponding resources are removed after a time-out period. Reservations can also be removed by explicit tear down messages. RSVP messages always follow the data path, and so RSVP can operate alongside standard routing protocols. If traffic is re-routed, refresh messages make reservations in the new data path.

In large networks the number of flows, and therefore the number of reservation states, is high. This can lead to problems storing and maintaining per-flow states in each router. Another architecture, Differentiated Services (DiffServ), has therefore been proposed to provide QoS in large-scale networks, and this is described in RFC 2475. In the DiffServ architecture, services are offered on an aggregate, rather than per-flow basis, in order to allow scaling up to larger networks. As much of the per-flow state as possible is forced to the edges of the network, and different services are offered for these aggregates in routers. This provides for scalability of the DiffServ architecture.

The service differentiation is achieved using the Differentiated Services (DS) field in the IP header. Packets are classified into Per-Hop Behaviour (PHB) groups at the edge nodes of the DiffServ network. Packets are handled in DiffServ routers according to the PHB indicated by the DS field in the message header. The DiffServ architecture does not provide any means for devices outside the domain to dynamically reserve resources or receive indications of network resource availability. In practice, service providers rely on subscription-time Service Level Agreements (SLAs) that statically define the parameters of the traffic that will be accepted from a customer.

The IETF Next Steps In Signaling (NSIS) Working Group is currently working on a protocol to meet new signaling requirements of today's IP networks, as defined in RFC 3726. The QoS signaling application protocol of NSIS is fundamentally similar to RSVP, but has several new features, one of which is the support of different QoS Models. One of the QoS models under specification is Resource Management in DiffServ (RMD). RMD defines scalable admission control methods for DiffServ networks, so that interior nodes inside a domain possess aggregated states rather than per-flow state information. For example, interior nodes may know the aggregated reserved bandwidth, rather than each flow's individual reservation. RMD also uses soft states (as with RSVP), and explicit release of resources is also possible. RMD also includes a "pre-emption" function, which is able to terminate a required number of packet flows when congestion occurs in order to maintain the required QoS for the remaining flows. This is described in WO 2006/052174.

A recent Internet Draft ("RSVP Extensions for Emergency Services", F. Le Faucheur, et. al., draft-lefaucheur-emergency-rsvp-02.txt) specifies an extension of RSVP for supporting emergency services. It defines a priority policy element for RSVP and describes examples of bandwidth allocation model for admission priority.

When per flow methods are used (IntServ with RSVP or QoS-NSLP signaling), the handling of high priority flows is not an issue, since each node maintains per flow states. Where a decision must be taken to admit or pre-empt a flow, account can be taken of the priority of the flow in each router. In "stateless" domains, such as RMD or RSVP aggregation, the interior nodes do not maintain per-flow state information, only aggregated states (e.g., per-class). Therefore, they cannot associate data packets with priority information. In stateless methods the edge nodes are responsible for admission and pre-emption of flows, and they also have to make the priority decisions.

In the methods described in the Internet Draft "RSVP Extensions for Emergency Services", (F. Le Faucheur, et. al., draft-lefaucheur-emergency-rsvp-02.txt) admission priority is taken into account. This means that these methods guarantee that higher priority flows can be admitted to the network in preference to lower priority flows. However, these solutions assume a slowly changing environment (i.e. a relatively slow increase of calls and no topology changes). The support of QoS, or priority handling in case of link or node failure, is based on per-flow states, which is not available with stateless protocols such as RMD.

RMD describes a method, known as a severe congestion algorithm, for ensuring QoS in a stateless DiffServ domain when rerouting takes place (due, for example, to link or node failure). If a router is severely congested (i.e. it is dropping a large number of packets), the RMD edge nodes terminate some of the flows in order to maintain QoS for the remaining flows. The priority of flows can be taken into account by preferentially dropping low priority flows, but the problem is not entirely solved.

This can be understood by considering the situation illustrated in FIG. 1. FIG. 1 is a schematic diagram of selected nodes in a stateless domain. The diagram shows an ingress edge 101, interior router 102 and egress edge 103. Suppose that there is congestion at the interior router 102. According to the RMD severe congestion algorithm, data packets are marked by the interior router in order to notify edge nodes about the congestion. The number of marked bytes indicates the excess traffic. In each egress edge node 103, the number of marked bytes is measured, and a decision taken to terminate a corresponding number of flows. This is achieved by the egress edge 103 sending a message to the ingress edge 101 to terminate the required flows. Priority is taken into account by selecting and terminating low priority flows.

However, it may be that terminating all of the low priority flows will still not be sufficient to overcome the congestion, in which case high priority flows will also be terminated. For example, suppose the traffic composition 104 at the egress edge node 103 is such that 90% of the flows are high priority calls 105. This may arise, for example, because this node directs traffic to an emergency centre. If 40% of all traffic has to be terminated, then all of the low priority calls 106 (10% of the total) will be terminated, but the congestion will still be present. The congestion can only be overcome by terminating approximately 30% of the high priority traffic in addition to all of the low priority traffic.

However, suppose there are many low priority calls passing the congested router 102, but which leave the network via other egress nodes. This situation is illustrated in FIG. 2, which shows nodes in a domain similar to that shown in FIG. 1. This time the domain has two different egress nodes 103, 203 that have different compositions 104, 204 of low and high priority traffic. In this example the first ingress edge node 103 has 10% low priority traffic 106 and 90% high priority traffic 105, as before. The second ingress node 203 has 80% low priority traffic 206 and 20% high priority traffic 205. This time, if there is a 40% overload at the router 102, both egress nodes would terminate 40% of the traffic. The second egress edge node 203 would be able to terminate only low priority flows, but the first ingress edge node 103 would still terminate 30% of its high priority traffic (as before). This is not desirable, because the second egress edge node 203 still has low priority flows 206 which could be terminated in preference to the high priority flows at the first egress node 103. If more low priority flows 206 were terminated by the second egress node 203, there would be no need for the first egress node 103 to terminate high priority flows 105.

As additional consideration is that, in emergency situations (i.e. when there are many high priority flows), link or node failures occur with higher probability than under normal conditions, leading to congestion. Thus there is a significant chance that high congestion and many high priority flows will occur at the same time. It is therefore important that networks should handle this problem properly.

STATEMENT OF THE INVENTION

The invention describes an admission control method and a preemption method in stateless network domains for handling priority traffic. The admission control algorithm ensures both QoS and priority in normal operation conditions. The preemption algorithm handles unexpected situations that are not solved by admission control.

In accordance with one aspect of the present invention there is provided a method of managing quality of service in an IP network which transmits data flows having at least two priority levels, the method comprising:

identifying, at an egress edge node of the network, that congestion is present in one or more routers within the network;
selecting data flows for termination to remove the congestion;
sending at least one flow termination notification from the egress edge node to an ingress edge node of the network, the at least one flow termination notification identifying the selected data flows;
immediately terminating low priority flows from the selected data flows at the ingress edge node; and
terminating high priority flows from the selected data flows at the ingress edge node only if congestion is still present after a predetermined delay period.

Thus when congestion is initially identified, low priority flows are terminated immediately, but there is a delay before high priority flows are terminated. This allows low priority flows passing through other egress edge nodes to be terminated, ensuring that high priority flows are not terminated unless there is no alternative. If the congestion is still present after the delay, then there is no option but to start terminating high priority flows as well.

The delay may be introduced preferably in either the ingress edge node or the egress edge node. If the delay is introduced in the ingress edge node, the egress edge may operate normally, and send an initial flow termination notification identifying all the data flows selected for termination. If the QoS solution is based on a bandwidth broker (BB), the delay can be introduced by the BB. When the initial flow termination notification is received by the ingress edge node, only low priority flows are terminated. If this does not solve the congestion, the egress edge node will continue to send subsequent flow termination notifications to the ingress edge node with instructions to terminate flows. After the delay, the ingress edge node terminates high priority flows if these subsequent termination notifications continue to arrive.

If the delay is introduced in the egress edge node, the ingress edge node can operate normally, and terminate all flows as soon as it is instructed to do so by a flow termination notification. When the egress edge identifies congestion, it initially sends a low priority flow termination notification to the ingress edge node, instructing the termination of low priority flows only. Other egress nodes should simultaneously be doing the same thing If these notifications are not successful in removing the congestion, the egress edge node sends a high priority flow termination notification after the delay, so that high priority flows are terminated only if there are no low priority flows left to be terminated.

The egress edge node preferably identifies that congestion is present in the network as a result of routers in the network marking the headers of data packets passing therethrough with a congestion flag, to indicate that the packets have passed through a congested router. The flow termination notification(s) is preferably a QoS-NSLP protocol message.

In order to ensure that the network has sufficient resources for high priority flows, the ingress edge node preferably admits low priority flows into the network only if the resources in the network are above a threshold. This threshold may correspond to a given number of high priority flows.

The threshold may be a static figure for the ingress edge node, but is preferably determined dynamically on the basis of one or more of the number of active resource reservations for high priority flows, the number of active resource reservations for low priority flows, the rate of resource requests for high priority flows and the rate of resource requests for low priority flows. The rate of resource requests for high priority data flows is particularly important: if this increases, the resources reserved for high priority flows (when a decision is being made as to whether low priority flows are admitted) may be increased. In one embodiment, the threshold is calculated as linear function of the rate of resource requests for high priority flows.

High priority flows can then be admitted into the network automatically, or at least on the basis of a single policy. This ensures that high priority flows enter the network with as small a delay as possible. If congestion occurs, the pre-emption process described above will identify congestion, and low priority flows will start to be terminated.

Preferably the ingress edge node sends a reservation message through the network to the egress edge node, the reservation message containing a resource reservation object for reserving resources along the data path and a resource availability object for collecting information about the available resources along the data path. The egress edge node may send a response to the ingress edge node, the response indicating whether the resource reservation was successful and indicating the available resources along the data path.

The invention also provides an IP network, an ingress edge node and/or an egress edge node configured to carry out any of the methods described above.

In accordance with another aspect of the present invention there is provided an egress edge node of an IP network, configured to:
  identify that congestion is present in one or more routers within the network;
  select data flows for termination to remove the congestion, the selected data flows including low priority flows or high priority flows or both;
  send, to an ingress edge node of the network, a low priority flow termination notification identifying the low priority flows from the selected data flows;
  monitor the congestion again after a predetermined delay period; and
  if the congestion is still present after the predetermined delay period, send to the ingress edge node a high priority flow termination notification, identifying the high priority flows from the data flows selected for termination.

In accordance with a further aspect of the present invention there is provided an ingress edge node of an IP network, configured to:
  reserve states in the network;
  forward data flows into the network on the basis of the reserved states;
  receive an initial flow termination notification from an egress edge node of the network, the initial flow termination notification identifying data flows selected for termination;
  terminate low priority flows from the selected data flows;
  wait for a predetermined delay period; and
  terminate high priority flows from the selected data flows only if a subsequent flow termination notification is received from the egress edge node after the predetermined delay period, the subsequent flow termination notification including further data flows selected for termination which include the high priority flows included in the initial termination notification.

In accordance with a yet further aspect of the present invention, there is provided an ingress edge node of an IP network, configured to:
  reserve states in the network; and
  forward data flows into the network on the basis of the reserved states;
wherein low priority flows are forwarded into the network only if the resources available in the network are higher than a threshold ensuring sufficient resources for a minimum number of high priority flows. The threshold is preferably determined dynamically on the basis of the rate of resource requests for high priority flows.

DETAILED DESCRIPTION OF THE PREFERRED EMBODIMENT

Figure 1:
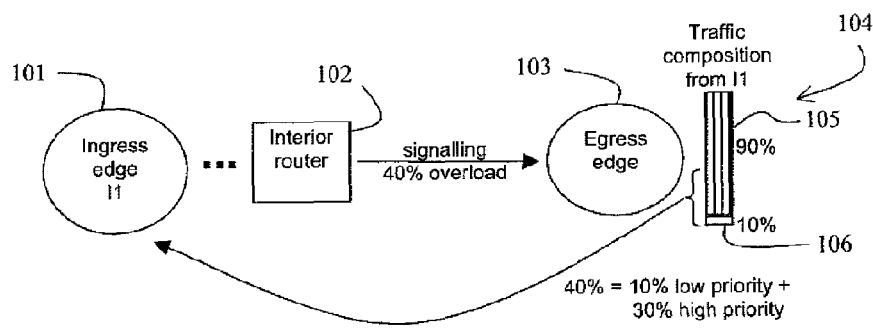
FIG. 1 is a schematic representation of elements of an IP DiffServ domain suffering from congestion.
Figure 2:
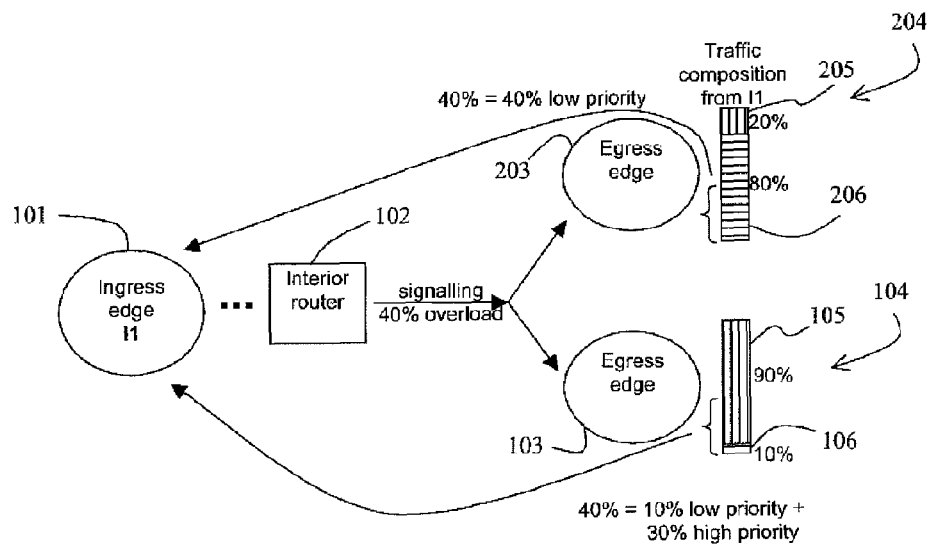
FIG. 2 is a schematic representation of an IP DiffServ domain similar to that of FIG. 1.

A typical IP DiffServ domain, such as that for example shown in FIG. 1, comprises ingress edge and egress edge nodes and interior routers. The DiffServ domain delivers low and high priority data flows. Priority is a "call level" descriptor, which means that "forwarding" priority can be different than "admission" or "pre-emption" priority. Low priority traffic can have the same packet level QoS requirements as high priority traffic. An example of this is the case of voice calls. A normal voice telephony call has the same delay/jitter requirements, at the packet level, as an emergency telephone call. However, when there is congestion, emergency calls should be kept in preference to normal voice telephony calls. Packet headers include a classification field, known as a Differentiated Service Code Point (DSCP), and it is possible to use different DSCPs for high and low priority flows. This means that they can be assigned different PHBs in DiffServ.

However, if the same DSCP is used for high and low priority flows, packets of both priorities can operate under the same forwarding behaviour. Furthermore, the number of available DSCPs is limited. This is related to a general problem of DiffServ, which is that the available codepoint space is very limited. It is therefore desirable not to distinguish between high and low priority flows by using different DSCPs. In the system described below, high and low priority flows are distinguished in the call level. At the packet level they behave in the same way, i.e. they can use the same DSCP.

In order to ensure QoS and correct priority allocation under both normal and unexpected conditions, an admission control process and a pre-emption process may be used.

The admission control process is used before a flow is admitted to the network. When a request arrives for a new low priority flow to an ingress edge node of a stateless domain, the ingress edge node tries to reserve resources for that flow by sending a reservation message through the stateless domain. In addition to the reservation, the availability of resources is checked for high priority calls. The available resources can be collected in the data path by using the AdSpec object in RSVP or by using Available QoS in QoS-NSLP. Low priority calls are admitted only if the available resources are higher than a threshold value. The threshold value is a function of the number of expected priority calls in the Ingress edge and the frequency of the new resource requests. In this way the sudden increase of resource requests can be taken into account when admitting low priority calls. Since the resource availability of resources for high priority flows are checked when low priority flows are admitted, additional resource reservation in the stateless domain for high priority flows is not necessary. Admission control of high priority flows can be based on a single policy decision in the ingress edge. This ensures fast admission for priority calls, since reservations for high priority flows within the stateless domains do not need to be performed.

Figure 3:
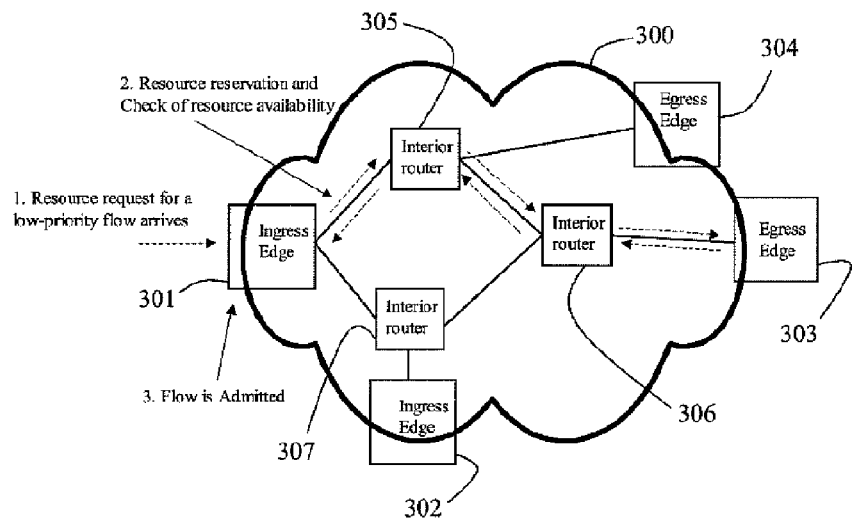
FIG. 3 is a schematic representation of an IP DiffServ domain illustrating an admission control process.

This process can be understood with reference to FIG. 3, which is a schematic illustration of an IP DiffServ domain 300 having two ingress edge nodes 301, 302, two egress edge nodes 303, 304 and three interior routers 305, 306, 307. Before a call or data flow is admitted to the DiffServ domain 300, a signaling request arrives at an ingress edge 301, indicating the required resources and the priority of the flow. The ingress edge 301 checks the priority of the requested flow. If it is high priority, the flow is admitted. Additional policies may be applied, such as for example limiting the priority flows by checking to see if a maximum number of admitted priority flows, or a maximum amount of resources reserved for priority flows, has been reached. This can be done in a per-ingress-node manner (hose model) or in a per-ingress-egress-pair manner (trunk model).

If the request belongs to a low priority flow, a signaling message is sent through the domain, requesting resources within the domain, and checking additional resource availability within the domain. The low priority flow is admitted if:

(1) the reservation within the domain is successful, and (2) the available resources are higher than a threshold value, denoted by A.

A may be a constant, configured for the ingress edge 301. Alternatively, it may be a function of the number of active resource reservations and frequency of the resource requests of low and high priority flows, denoted by $n_{low}$, $r_{low}$, $n_{high}$, $r_{high}$, respectively.

$$A=F(n_{low},r_{low},n_{high},r_{high})$$

As a simple example, A may be a linear function of the rate of the frequency of high priority call requests:

$$A=a+b*r_{high}$$

Here a indicates a constrained resource reserved for high priority flows. The term $b*r_{high}$ enables a significant increase of flows can be taken into account. For example, if the number of emergency calls increases considerably due to an emergency situation, $r_{high}$ increases and more resources are therefore reserved for high priority calls (the number of which is also expected to increase considerably).

Two options are available for checking the available resources and making a bandwidth reservation for low priority flows. In one option, the threshold A is configured in the ingress node 301. In the other option A is determined in each node.

If A is a per-ingress parameter (configured at the ingress edge 301), then using the NSIS protocol, different processes for reservation reservations are described in the QoS-NSLP and QSpec Template. One possible sender initiated reservation process is as follows: The ingress edge node 301 sends, to an egress edge node 303, a RESERVE message that includes "QoS Desired" and "QoS Available" objects. "QoS Desired" is used to reserve the required resources along the path. "QoS Available" collects the available resources. In response, the egress edge node 303 sends a RESPONSE message, which indicates whether the reservation was successful or not. It also indicates to the ingress edge node 301 the available resources along the data path. The ingress edge node 301 admits the low priority flow only if the available resources are higher than A. If this condition is not fulfilled, the resources (which have just been reserved) are removed.

In the other option, A is configured in each hop. In this case, as the RESERVE message travels from the ingress 301 to the egress 303, it faces a double admission condition at each hop. Each node operates the normal reservation based condition, as well as comparing the local link free capacity to A. If reservation is completed and all of the local links have sufficient resources compared to their local resource parameter, the flow is admitted.

The admission control process provides QoS for flows admitted under normal operating conditions. In order to handle extreme conditions, such as a large increase of the call rate, and/or link or node failure (which may result in an unexpected large burst of high priority flows), a pre-emption algorithm may also be required. The pre-emption algorithm is used to terminate some flows in order to maintain QoS for the other flows. The pre-emption algorithm described ensures that low priority flows are terminated and high priority flows are preserved.

It will be appreciated that, if there are not enough low priority traffic flows that can be terminated, higher priority calls will be terminated as well. The pre-emption algorithm ensures that high priority flows are terminated only if there are no lower priority flows that can be terminated. The pre-emption algorithm is also responsible for terminating low priority calls in case of severe congestion after rerouting, e.g. due to link or node failure.

Figure 4:
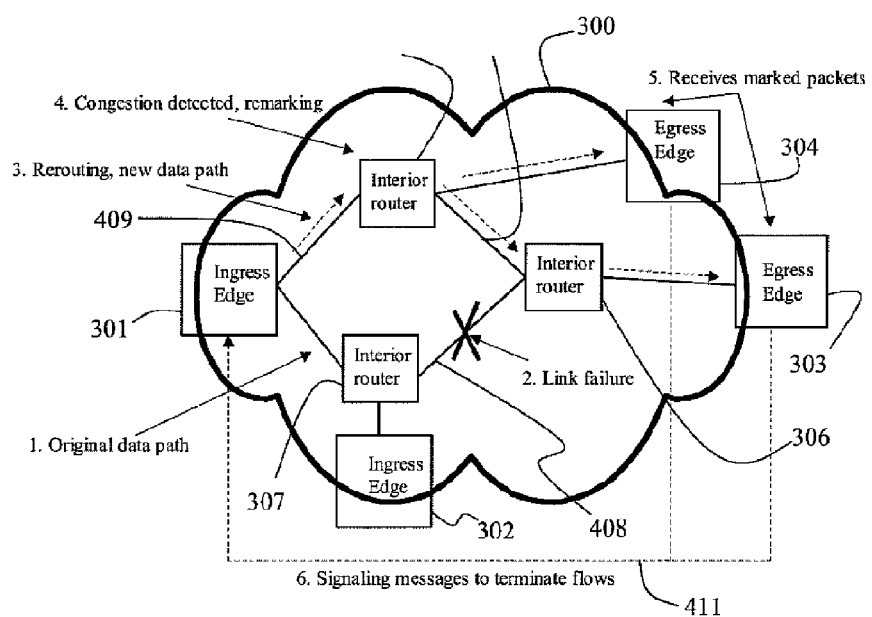
FIG. 4 is a schematic representation of an IP DiffServ domain illustrating a congestion control process.

Under unexpected conditions, the traffic can be higher than the capacity of the routers, or links. An example is shown in FIG. 4, which illustrates the domain 300 shown in FIG. 3. In the situation shown in FIG. 4, a link 408 in a data path fails between interior routers 307, 308. After detecting link failure, the routing protocol reroutes the traffic to an alternative data path via links 409, 410 and routers 305, 306. In this situation there is no admission control before rerouting, so it can occur that the traffic will be higher than the capacity of one or more of the routers 305, 306 or links 409, 410 in the new path. The congested router 305 drops the packets that cannot be handled.

RMD defines a severe congestion handling function to prevent packets simply being dropped. In RMD, each router 305, 306, 307 periodically measures the number of dropped bytes, and re-marks packets passing the congested router or routers. The packets are marked in the DSCP field. The number of re-marked bytes indicates the excess traffic. The operation of the interior routers is almost identical to that described in the IETF draft [A. Bader, et. al., "RMD-QOSM: An NSIS QoS Signaling Policy Model for Networks Using Resource Management in DiffServ (RMD);" work in progress] and in WO 2006/052174.

The egress edge nodes 303, 304 have a dedicated function to handle severe congestion within the domain. Each egress edge node 303, 304 monitors if there are re-marked packets and, if re-marked packets are detected, it periodically measures the number of marked bytes. It also identifies the affected flows and determines how many, and which, flows should be terminated to relieve the congestion. The flows to be terminated are selected according to their priority. The lower priority flows are selected first. If there are not enough low priority flows that can be terminated, higher priority flows are selected as well. The egress edge nodes 304, 305 send a notification message 411, for each selected flow, to the corresponding ingress edge node 301 (at which the flow originated), in order to terminate the selected flows.

When this notification message 411 is received, the ingress edge node 301 checks the priority of the corresponding flow, and from which egress edge node 303 the termination message has arrived. If the priority is low, the flow is terminated immediately.

If the notification message corresponds to a high priority flow, the flow is not terminated immediately. Instead, the decision as to whether the flow should be terminated is suspended for a time period $T_{delay}$, which is typically 2-3 measurement periods long. The selected high priority flows are terminated only if termination messages from the same Egress Edge are still being received after $T_{delay}$. If there are no further notification messages for high-priority flows, the selected high priority flows are not terminated. This algorithm ensures that, if there are still low priority flows passing the congested node 305 but leaving the domain 300 through different egress edge nodes 304, these low priority flows will be terminated instead of the high priority flows. Termination of high priority flows is therefore avoided.

The algorithm can be further refined if the bit rate of the flows selected for termination is known in the ingress edge node 301 (e.g. by measurement, or from the traffic type). In this case the ingress edge node 301 can monitor the amount of the traffic of the selected high priority flows and, after the delay time, only terminate those flows that correspond to the actual overload.

In an alternative embodiment, the delay can be introduced and monitored by a Bandwidth Broker (BB) which instructs the ingress edge node whether or not flows should be terminated depending on their priority.

In an alternative embodiment, the egress edge nodes 303, 304 withhold the termination notification messages 411 for the high priority flows when they first receive marked packets indicating congestion. The termination notification messages 411 for high priority flows are sent only if marked packets indicating congested high priority flows are still being received after the delay time interval $T_{delay}$. In this embodiment the ingress edge node 301 behaves in the same way for high and low priority flows: they are terminated them immediately the notification message 411 is received.

The pre-emption algorithm is also responsible for maintaining QoS for high priority traffic when the resources for high priority flows requested at the ingress edge node 301 is higher than A. In this case, the admission control process still admits high priority flows automatically (unless prevented by another policy). If this leads to congestion then low priority flows in the same data path will be terminated by the pre-emption algorithm, as just described.

The processes described thus handle high priority and low priority traffic dynamically. The admission control process ensures that there will be resources for high priority flows, and for low priority flows if they are admitted. However, there is no need to reserve bandwidth for high priority flows. Resources are therefore used more efficiently.

The admission of high priority flows is fast, since there is no resource reservation within the DiffServ domain for these flows.

The admission control and pre-emption processes together provide a robust QoS support. Slow changes in the network are handled by admission control. When traffic volumes change rapidly, the pre-emption algorithm can react to the changes and restore QoS for most or all calls involving high priority flows.

Thus the processes described can efficiently handle large increases of reservation requests for high priority flows. The processes are based on per-class states, so are applicable with stateless protocols such as RMD. Even without per-flow states, the processes described solve severe congestion due to rerouting. Admission control is more bandwidth efficient. The termination of lower priority traffic instead of high priority traffic can be avoided in certain situations.

It will be appreciated that variations from the above described embodiments may fall within the scope of the invention.

The invention claimed is:

1. A method of managing quality of service (QoS) in an Internet Protocol (IP) network which transmits data flows having at least two priority levels, the method comprising:
    identifying, at an egress edge node of the network, that congestion is present in one or more routers within the network;
    selecting data flows for termination to remove the congestion;
    sending at least one flow termination notification from the egress edge node to an ingress edge node of the network, the at least one flow termination notification identifying the selected data flows;
    immediately terminating low priority flows from the selected data flows at the ingress edge node;
    terminating high priority flows from the selected data flows at the ingress edge node only if congestion is still present after a predetermined delay period introduced by the ingress edge node; and
    forwarding any low priority data flows, received at the ingress edge node, into the network if the resources available in the network are higher than a threshold;
    wherein an initial flow termination notification identifying all the selected data flows is sent from the egress edge node to the ingress edge node as soon as the congestion is identified at the egress edge node;
    wherein the low priority flows from the selected data flows are terminated at the ingress edge node when the initial termination notification is received;
    wherein subsequent flow termination notifications identifying further data flows selected for termination are sent from the egress edge node to the ingress edge node if congestion is still present after predetermined measurement periods; and
    wherein the high priority flows from the selected data flows are terminated at the ingress edge node only if:
        at least one of the subsequent termination notification messages are received by the ingress edge node after the predetermined delay period; and
        the at least one subsequent termination notification message received after the predetermined delay period includes the same high priority flows in the further data flows selected for termination.

2. The method of claim 1, wherein the bit rate of the selected high priority flows is known by the ingress edge node, and no more high priority flows are terminated than required to reduce the congestion.

3. The method of claim 1, wherein the predetermined delay period is introduced by a bandwidth broker.

4. The method of claim 3, wherein:
    an initial flow termination notification identifying all the selected data flows is sent from the egress edge node to the ingress edge node as soon as the congestion is identified at the egress edge node;
    the low priority flows from the selected data flows are terminated by the bandwidth broker when the initial termination notification is received;
    subsequent flow termination notifications identifying further data flows selected for termination are sent from the egress edge node to the ingress edge node if congestion is still present after predetermined measurement periods; and
    the high priority flows from the selected data flows are terminated at the bandwidth broker only if:
        at least one of the subsequent termination notification messages are received by the ingress edge node after the predetermined delay period; and the at least one subsequent termination notification message received after the predetermined delay period includes the same high priority flows in the further data flows selected for termination.

5. The method of claim 1, wherein the predetermined delay period is introduced by the egress edge node.

6. The method of claim 5, wherein:
a low priority flow termination notification, identifying low priority flows from the selected data flows, is sent from the egress edge node to the ingress edge node as soon as the congestion is identified at the egress edge node;
the low priority flows from the selected data flows are terminated at the ingress edge node when the low priority termination notification is received;
a high priority flow termination notification identifying the high priority flows from the data flows selected for termination is sent from the egress edge node to the ingress edge node if the congestion is still present after the predetermined delay period; and
terminating the selected high priority flows at the ingress edge node when the high priority flow termination notification is received.

7. The method of claim 1, wherein the one or more routers mark the headers of data packets passing through the one or more routers with a congestion flag to indicate that such packets have passed through a congested router.

8. The method of claim 1, wherein the flow termination notification is a Quality of Service—Next Steps In Signaling (NSIS) Signaling Layer Protocol (QoS-NSLP) protocol message.

9. The method of claim 1, wherein the threshold is determined to ensure that sufficient resources are available for a given number of high priority flows.

10. The method of claim 1, wherein the threshold is determined on the basis of one or more of the number of active resource reservations for high priority flows, the number of active resource reservations for low priority flows, the rate of resource requests for high priority flows and the rate of resource requests for low priority flows.

11. The method of claim 10, wherein the threshold is a linear function of the rate of resource requests for high priority flows.

12. The method of claim 1, wherein the low priority data flow is only admitted to the network if a data path is reserved through the network.

13. The method of claim 12, wherein, when the ingress edge node receives the request for the low priority data flow, a reservation message is sent to the egress edge node, the reservation message containing a resource reservation object for reserving resources along the data path and a resource availability object for collecting information about the available resources along the data path.

14. The method of claim 13, wherein the egress edge node responds to receipt of the reservation message by sending a response to the ingress edge node, the response indicating whether the resource reservation was successful and indicating the available resources along the data path.

15. The method of claim 1, wherein, if the ingress edge node receives a request for a high priority data flow, the high priority data flow is admitted into the network on the basis of a single policy decision.

16. The method of claim 1, wherein, if the ingress edge node receives a request for a high priority data flow, the high priority data flow is admitted into the network automatically.

17. The method of claim 1, wherein the IP network is constructed using Differentiated Services Architecture.

18. An IP network comprising:
one or more routers operative to route, through the network, data flows having at least two priority levels;
an egress node operative to:
identify that congestion is present in one or more routers within the network,
select data flows for termination to remove the congestion, and
send at least one flow termination notification from the egress edge node to an ingress edge node of the network, the at least one flow termination notification identifying the selected data flows;
wherein an initial flow termination notification identifying all the selected data flows is sent from the egress edge node to the ingress edge node as soon as the congestion is identified at the egress edge node;
wherein subsequent flow termination notifications identifying further data flows selected for termination are sent from the egress edge node to the ingress edge node if congestion is still present after predetermined measurement periods; and
an ingress node operative to:
immediately terminate low priority flows from the selected data flows, and
terminate high priority flows from the selected data flows only if congestion is still present after a predetermined delay period introduced by the ingress node;
wherein the low priority flows from the selected data flows are terminated at the ingress edge node when the initial termination notification is received;
wherein the high priority flows from the selected data flows are terminated at the ingress edge node only if:
at least one of the subsequent termination notification messages are received by the ingress edge node after the predetermined delay period; and
the at least one subsequent termination notification message received after the predetermined delay period includes the same high priority flows in the further data flows selected for termination; and
wherein a threshold represents sufficient resources for a minimum number of high priority flows such that low priority flows are forwarded into the network only if the resources available in the network are higher than the threshold.

* * * * *